US011604656B2

(12) United States Patent
Kim et al.

(10) Patent No.: US 11,604,656 B2
(45) Date of Patent: Mar. 14, 2023

(54) METHOD AND APPARATUS FOR MANAGING APPLICATION

(71) Applicant: SAMSUNG ELECTRONICS CO., LTD., Suwon-si (KR)

(72) Inventors: Moonkyung Kim, Suwon-si (KR); Seyeong Lee, Suwon-si (KR); Myeongjin Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 16/922,151

(22) Filed: Jul. 7, 2020

(65) Prior Publication Data

US 2021/0011736 A1    Jan. 14, 2021

(30) Foreign Application Priority Data

Jul. 10, 2019  (KR) ........................ 10-2019-0083389

(51) Int. Cl.
  *G06F 8/65* (2018.01)
  *G06F 9/4401* (2018.01)
  (Continued)

(52) U.S. Cl.
  CPC .............. *G06F 9/4411* (2013.01); *G06F 8/61* (2013.01); *G06F 8/65* (2013.01); *G06F 9/445* (2013.01);
  (Continued)

(58) Field of Classification Search
  None
  See application file for complete search history.

(56) References Cited

U.S. PATENT DOCUMENTS 8,387,141 B1  2/2013  Zhukov et al.
9,357,031 B2  5/2016  Keith, Jr.
(Continued)

FOREIGN PATENT DOCUMENTS

EP    1 826 982    8/2007
EP    2998899      3/2016
(Continued)

OTHER PUBLICATIONS

International Search Report dated Oct. 26, 2020 in corresponding International Application Mo. PCT/KR2020/008778.
(Continued)

*Primary Examiner* — Philip Wang
(74) *Attorney, Agent, or Firm* — Nixon & Vanderhye P.C.

(57) ABSTRACT

An electronic device is disclosed that includes a memory storing a first application run based on a first sandbox environment and a processor connected with the memory. The memory stores instructions which, when executed, cause the processor to determine whether it is necessary to change a first user identifier (UID) for the first application in response to an application installation request requesting to update the first application to a second application, assign a second UID for the second application using a UID mapping resident program based on it being necessary to change the first UID, and construct a second sandbox environment for the second application to have the second UID and a resource included in the first sandbox environment.

20 Claims, 10 Drawing Sheets

(51) Int. Cl.
*G06F 9/455* (2018.01)
*G06F 9/445* (2018.01)
*G06F 8/61* (2018.01)

(52) U.S. Cl.
CPC .......... *G06F 9/455* (2013.01); *G06F 9/45558* (2013.01)

(56) References Cited

U.S. PATENT DOCUMENTS

| | | |
|---|---|---|
| 9,569,194 B2 | 2/2017 | Keith, Jr. |
| 9,870,239 B2 | 1/2018 | Xin et al. |
| 10,061,908 B2 | 8/2018 | Katsuta |
| 10,083,022 B2 | 9/2018 | Fukui et al. |
| 10,140,115 B2 | 11/2018 | Fukui et al. |
| 10,360,375 B2 | 7/2019 | Seo et al. |
| 10,394,547 B2 | 8/2019 | Fukui et al. |
| 10,432,752 B2 | 10/2019 | Lee et al. |
| 10,511,630 B1* | 12/2019 | Weiss ............... H04L 63/20 |
| 10,938,954 B2 | 3/2021 | Lee et al. |
| 2005/0273486 A1 | 12/2005 | Keith, Jr. |
| 2006/0031529 A1 | 2/2006 | Keith, Jr. |
| 2007/0087765 A1 | 4/2007 | Richardson et al. |
| 2011/0244830 A1 | 10/2011 | Chesnutt et al. |
| 2013/0204975 A1 | 8/2013 | Keith, Jr. |
| 2014/0137255 A1* | 5/2014 | Wang ............... G06F 21/566 726/24 |
| 2016/0077819 A1 | 3/2016 | Xin et al. |
| 2016/0239659 A1* | 8/2016 | Seo .................. G06F 21/51 |
| 2017/0017780 A1 | 1/2017 | Katsuta |
| 2019/0052732 A1 | 2/2019 | Lee et al. |
| 2019/0196805 A1* | 6/2019 | Lee .................. G06F 21/6209 |
| 2020/0371821 A1* | 11/2020 | Ou .................. G06F 9/451 |
| 2020/0409680 A1* | 12/2020 | Vaddi ............... G06F 8/71 |
| 2022/0174106 A1* | 6/2022 | Eckerdal ............ G06F 3/04842 |

FOREIGN PATENT DOCUMENTS

| | | |
|---|---|---|
| KR | 10-2014-0041988 | 4/2014 |
| WO | 2013/063791 | 5/2013 |

OTHER PUBLICATIONS

Extended Search Report and Written Opinion dated Jun. 1, 2022 in counterpart European Patent Application No. 20836148.5.
Barrera, David et al., "Understanding and improving app installation security mechanisms through empirical analysis of android," Proceedings of the Second ACM Workshop on Security and Privacy in Smartphones and Mobile Devices, SPSM '12, Jan. 1, 2012, p. 81.
Kywe, Su Mon et al., "PrivateDroid: Private 1-15 Browsing Mode for Android," 2014 IEEE 13th International Conference on Trust, Security and Privacy in Computing and Communications, IEEE, Sep. 24, 2014, pp. 27-36.
Xing Luyi et al., "Upgrading Your Android, Elevating My Malware: Privilege Escalation through Mobile OS Updating," 2014 IEEE Symposium on Security and Privacy, IEEE, May 18, 2014, pp. 393-408.

* cited by examiner

METHOD AND APPARATUS FOR MANAGING APPLICATION

CROSS-REFERENCE TO RELATED APPLICATION

This application is based on and claims priority under 35 U.S.C. § 119 to Korean Patent Application No. 10-2019-0083389, filed on Jul. 10, 2019, in the Korean Intellectual Property Office, the disclosure of which is incorporated by reference herein its entirety.

BACKGROUND

1. Field

The disclosure relates to technologies for installing or updating an application in an electronic device.

2. Description of Related Art

An electronic device, such as a smartphone or a tablet, may include an application which provides various functions or services. The application may be included in the electronic device in the form of being pre-loaded and may be downloaded in the electronic device through an application market (e.g., Google Play Store, App Store, or the like).

Such an application may include a developer signature to prevent the application from being falsified by a malicious user of the application or being replaced with another application. For example, the application installed in the electronic device may be signed using a key (e.g., a developer key) of an application developer. When the same application as a previously installed application is installed or updated, the electronic device may compare signature information of the old application with signature information of the new application and may permit the new application to be installed only when the signature information of the old application is identical to the signature information of the new application, thus ensuring integrity of the application and security of the electronic device.

Furthermore, the electronic device may assign a user ID (UID) for an application to the application installed in the electronic device. Furthermore, the electronic device may construct a sandbox for the application based on the assigned UID. The sandbox may construct a resource space. Only the application which is assigned the UID has authorization capable of accessing a resource of the resource space. Thus, the electronic device may assign UIDs which are not duplicated to applications installed in the electronic device to protect a resource of each of the applications.

An electronic device may update an application installed in the electronic device. When the application is updated, the updated application having the same UID as an old application may use a resource of a sandbox environment used by the old application. In other words, when package names, signature keys, and UIDs of the previously installed application and the updated application are the same as each other, the updated application may be updated in state where a resource of the old application is maintained. Herein, the updated application may fail to maintain a UID used by the old application. For example, the updated application does not use a previously used UID due to a change in the policy of an operating system platform installed in the electronic device. However, it may be impossible to change a UID assigned to the application. Thus, it is necessary to newly install an application to be updated independently of the old application. Furthermore, because the newly installed application has a UID different from the UID of the old application, the updated application may fail to access a sandbox environment used by the old application. Thus, the updated application may fail to use user data generated using the old application.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and to provide at least the advantages described below. Embodiments of the disclosure provide a method and an apparatus for managing application to change the UID assigned after an application is installed.

Additional embodiments will be set forth in part in the description which follows and, in part, will be apparent from the description.

In accordance with an example embodiment of the disclosure, an electronic device is provided. The electronic device may include: a memory storing a first application run based on a first sandbox environment and a processor connected with the memory. The memory may store instructions which, when executed, cause the processor to: determine whether it is necessary to change a first user identifier (UID) for the first application in response to an application installation request requesting to update the first application to a second application, assign a second UID for the second application using a UID mapping resident program based on it being necessary to change the first UID, and construct a second sandbox environment for the second application to have the second UID and a resource included in the first sandbox environment.

In accordance with another example embodiment of the disclosure, a method for updating an application in an electronic device is provided. The method may include: obtaining an application installation request requesting to update a first application run based on a first sandbox environment to a second application, determining whether it is necessary to change a first UID for the first application in response to the application installation request, assigning a second UID for the second application using a UID mapping resident program based on it being necessary to change the first UID, and constructing a second sandbox environment for the second application to have the second UID and a resource included in the first sandbox environment.

In accordance with another example embodiment of the disclosure, a storage medium is provided. The storage medium may be a non-transitory computer readable storage medium which may store a program which, when executed by a processor, causes an electronic device to perform a process including: obtaining an application installation request requesting to update a first application run based on a first sandbox environment to a second application, determining whether it is necessary to change a first UID for the first application in response to the application installation request, assigning a second UID for the second application using a UID mapping resident program based on it being necessary to change the first UID, and constructing a second sandbox environment for the second application to have the second UID and a resource included in the first sandbox environment.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description taken in conjunction with the accompanying drawings, in which.

With regard to description of drawings, the same or similar denotations may be used for the same or similar components.

DETAILED DESCRIPTION

Hereinafter, various example embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
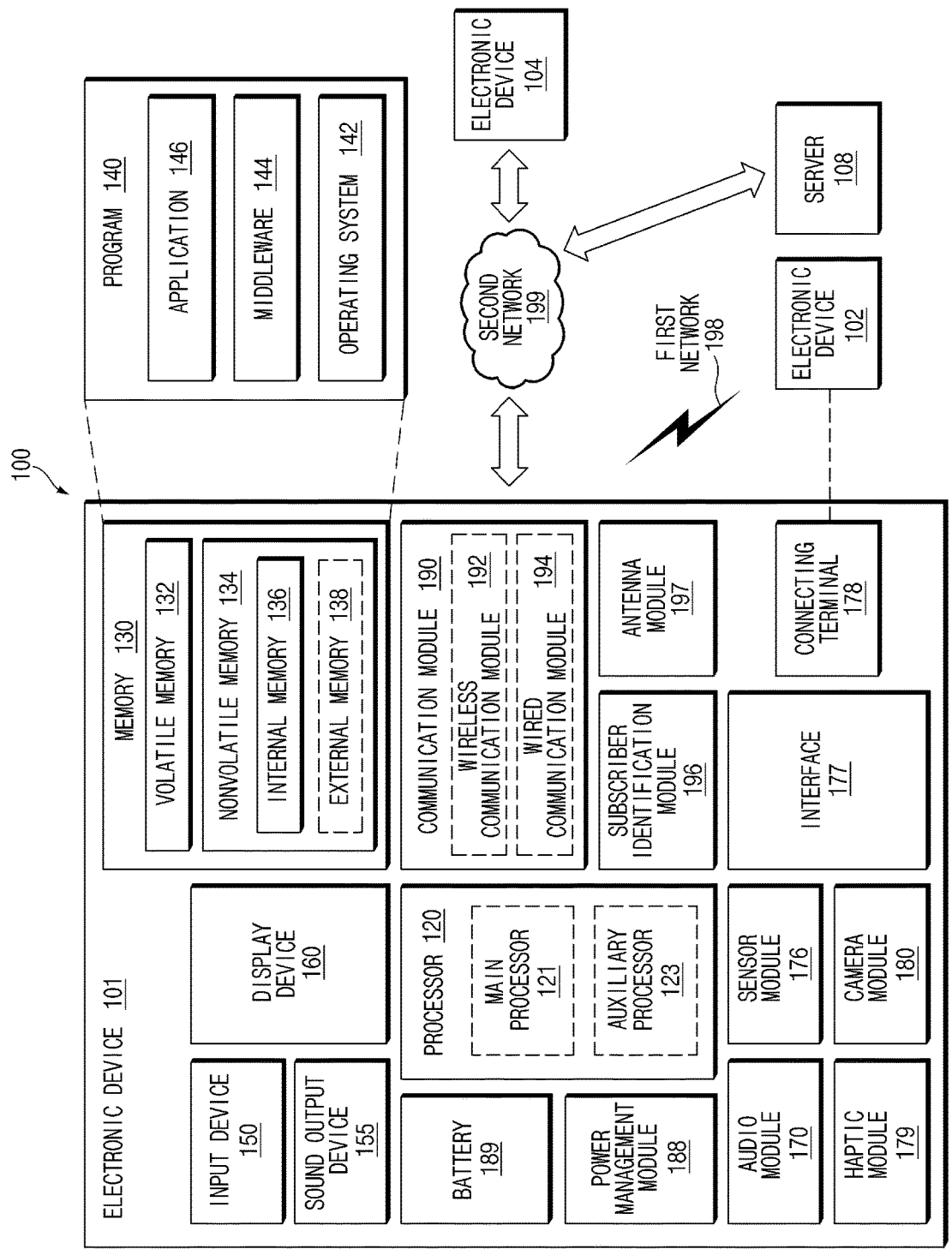
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 may communicate with an electronic device 102 through a first network 198 (e.g., a short-range wireless communication network) or may communicate with an electronic device 104 or a server 108 through a second network 199 (e.g., a long-distance wireless communication network) in the network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121 or with the main processor 121. Additionally or alternatively, the auxiliary processor 123 may use less power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through the sound output device 155 or an external electronic device (e.g., the electronic device 102 (e.g., a speaker or a headphone)) directly or wirelessly connected to the electronic device 101.

The sensor module 176 may generate an electrical signal or a data value corresponding to an operating state (e.g., power or temperature) inside or an environmental state (e.g., a user state) outside the electronic device 101. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, image signal processors, or flashes.

The power management module 188 may manage power supplied to the electronic device 101. According to an embodiment, the power management module 188 may be implemented as at least a part of a power management integrated circuit (PMIC).

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the direct (e.g., wired) communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module). The corresponding communication module among the above communication modules may communicate with the external electronic device 104 through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by one or more external electronic devices among the external electronic devices 102, 104, or 108. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

Figure 2:
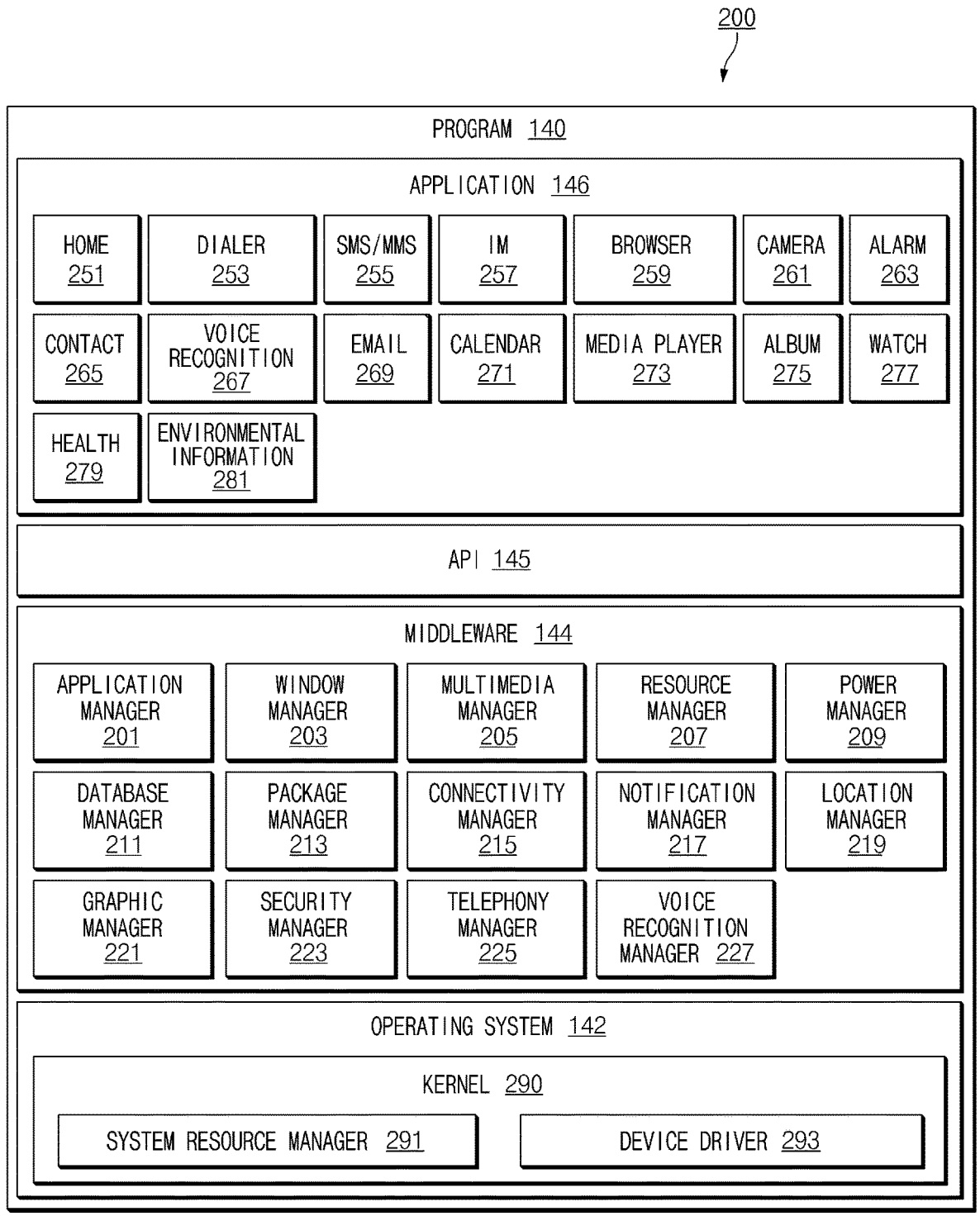
FIG. 2 is a block diagram illustrating an example program according to various embodiments.

FIG. 2 is a block diagram 200 illustrating an example program according to various embodiments.

According to an embodiment, a program 140 may include an operating system 142 for controlling one or more resources of an electronic device (e.g., an electronic device 101 of FIG. 1), middleware 144, and an application 146 executable by the operating system 142. The operating system 142 may include, for example, Android™, iOS™, Windows™, Symbian™, Tizen™, or Bath™. For example, at least a portion of the program 140 may be preloaded on the electronic device 101 when the electronic device 101 is manufactured or may be downloaded and updated from an external electronic device (e.g., an electronic device 102 or 104 or a server 108 of FIG. 1) when the electronic device 101 is used by a user.

The operating system 142 may control to manage (e.g., assign or collect) one or more system resources (e.g., a process, a memory, or a power supply) of the electronic device 101. Additionally or alternatively, the operating system 142 may include one or more driver programs for driving another hardware device of the electronic device 101, for example, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197 of FIG. 1. The operating system 142 may include a kernel 290 for managing one or more system resources of the electronic device 101. The kernel 290 may be compared with a shell located in an outermost portion of the operating system 142 to process a user command. A service of the kernel 290 may be requested through another portion of the operating system 142 or a series of program interfaces known as system paging. The kernel 290 may include, for example, a system resource manager 291 or a device driver 293. The system resource manager 291 may perform control, allocation, retrieval, or the like of system resources. According to an embodiment, the system resource manager 291 may include a process management unit, a memory management unit, a file system management unit, or the like. The device driver 293 may include, for example, a display driver, a camera driver, a Bluetooth driver, a shared memory driver, a USB driver, a keypad driver, a Wi-Fi driver, an audio driver, or an inter-process communication (IPC) driver.

The middleware 144 may provide the application 146 with various functions via an application programming interface (API) 145 such that functions or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may manage, for example, a life cycle of the application 146. The window manager 203 may manage, for example, one or more graphic user interface (GUI) resources used on a screen. The multimedia manager 205 may identify, for example, one or more formats necessary for playing media files and may encode or decode a corresponding media file among the media files using a codec suitable for the format selected among the one or more formats. The resource manager 207 may manage, for example, a source code of the application 146 or a memory space of a memory 130 of FIG. 1. The power manager 209 may manage, for example, capacity, temperature, or power of the battery 189 and may determine or provide information associated with an operation of the electronic device 101 using the corresponding information among the capacity, the temperature, or the power of the battery 189. According to an embodiment, the power manager 209 may interwork with a basic input/output system (BIOS) (not shown) of the electronic device 101.

The database manager 211 may generate, search, or modify, for example, a database to be used by the application 146. The package manager 213 may manage to install or update, for example, an application distributed in the form of a package file. The connectivity manager 215 may manage, for example, a wireless connection or a direct connection between the electronic device 101 and the external electronic device. The notification manager 217 may provide, for example, a function for notifying a user that a specified event (e.g., an incoming call, a message, or an alarm) occurs. The location manager 219 may manage, for example, location information of the electronic device 101. The graphic manager 221 may manage, for example, one or more graphic effects to be provided to the user or may manage a UI associated with the graphic effects.

The security manager 223 may provide, for example, system security or user authentication. The telephony manager 225 may manage, for example, a voice or video call function provided by the electronic device 101. The voice recognition manager 227 may transmit, for example, voice data of the user to the server 108 and may receive a command corresponding to a function to be performed in the electronic device 101 based at least in part on the voice data or text data converted based at least in part on the voice data from the server 108. According to an embodiment, the middleware 144 may dynamically fail to include some of the existing components or may further include new components. According to an embodiment, at least a portion of the middleware 144 may be included as a portion of the operating system 142 or may be implemented as separate software different from the operating system 142.

According to an embodiment, the middleware 144 may include a runtime library (not shown). The runtime library may include, for example, a library module that is used by a compiler to add a new function through a programming language while the application 146 is being executed. The runtime library may perform input/output management, memory management, capacities about arithmetic functions, or the like.

The API 145 may be, for example, a set of programming functions and may be configured according to an operating system. For example, in the case where the operating system is Androidor™ or iOS™, it may provide one API set per platform. In the case where the operating system is Tizen™, it may provide two or more API sets per platform.

The application 146 may include, for example, a home application 251, a dialer application 253, an SMS/MMS application 255, an instant message (IM) application 257, a browser application 259, a camera application 261, an alarm application 263, a contact application 265, a voice recognition application 267, an email application 269, a calendar application 271, a media player application 273, an album application 275, a watch application 277, a health application 279 (e.g., an application for measuring biometric information such as an exercise quantity or blood sugar), or an environmental information application 281 (e.g., an application for measuring information about barometric pressure, humidity, or temperature). According to an embodiment, the application 146 may further include an information exchanging application (not shown) capable of supporting information exchange between the electronic device 101 and the external electronic device. The information exchanging application may include, for example, a notification relay application configured to transmit specified information (e.g., a call, a message, or an alarm) to the external electronic device or a device management application configured to manage the external electronic device. For example, the notification relay application may transmit notification information corresponding to a specified event (e.g., mail reception) which occurs in another application (e.g., the email application 269) of the electronic device 101 to the external electronic device. Additionally or alternatively, the notification relay application may receive notification information from the external electronic device and may provide a user of the electronic device 101 with the received notification information.

The device management application may control, for example, a power (e.g., turn-on/turn-off of the power) of the external electronic device which communicates with the electronic device 101 and a power of each of some components (e.g., the display device 160 or the camera module 180) of the electronic device 101 or may control a function (e.g., brightness, resolution, or focus) of each of some components (e.g., the display device 160 or the camera module 180) the electronic device 101. Additionally or alternatively, the device management application may support the installation, deletion, or update of an application running on the external electronic device.

Figure 3:
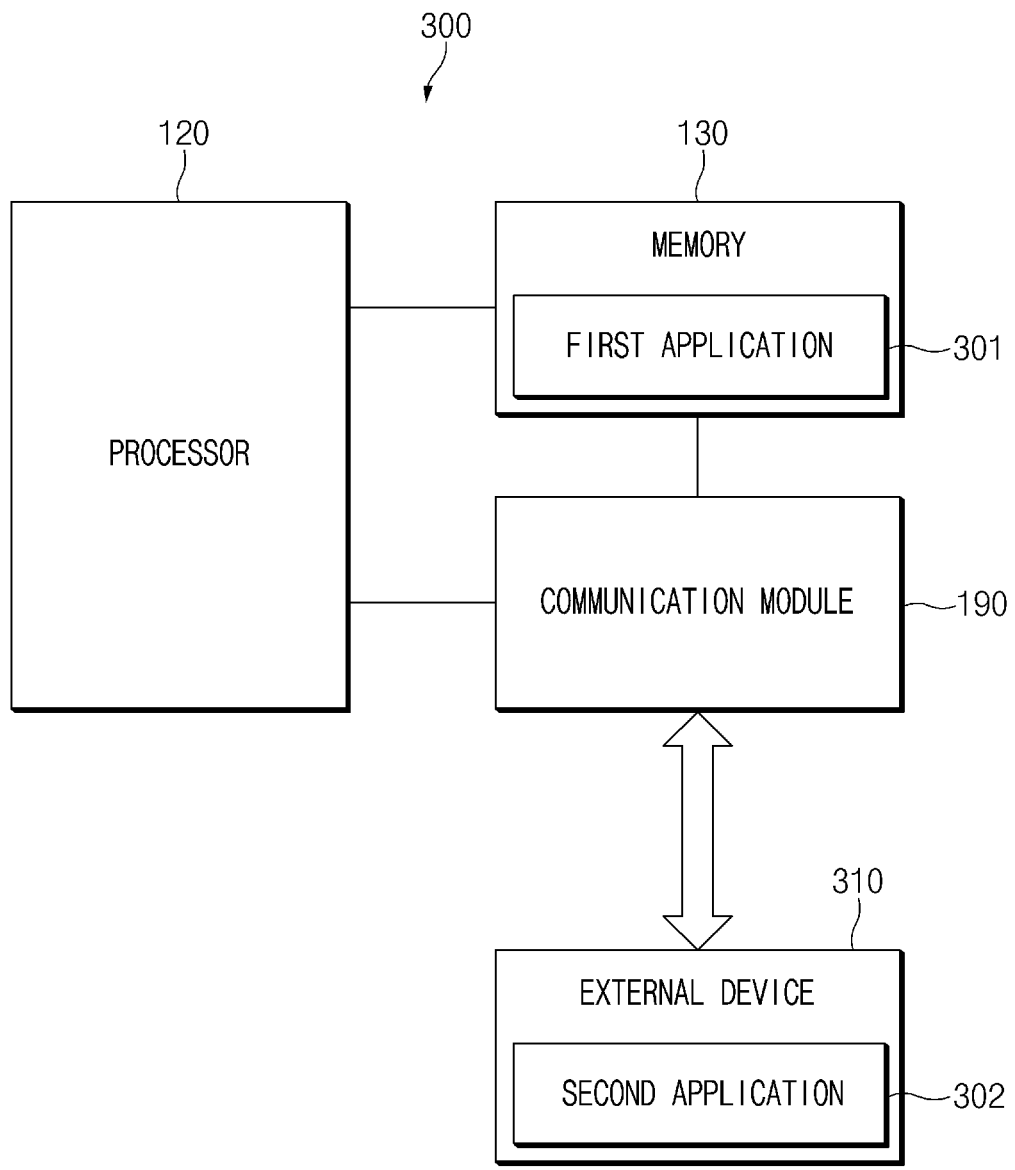
FIG. 3 is a block diagram illustrating an example configuration of an example electronic device and an external device communicable with the electronic device according to an embodiment.

FIG. 3 is a block diagram 300 illustrating an example configuration of an example electronic device (e.g., an electronic device 101 of FIG. 1) and an example external device 310 (e.g., an electronic device 102, an electronic device 104, or a server 108 of FIG. 1) communicable with the electronic device according to an embodiment.

According to an embodiment, the electronic device may include a processor (e.g., including processing circuitry) 120, a memory 130, and a communication module (e.g., including communication circuitry) 190. The electronic device may download an application from the external device 310 via the communication module 190. For example, in a state where a first application 301 is installed in the memory 130 of the electronic device, the electronic device may download data from the external device 310 to update the first application 301 to a second application 302.

According to an embodiment, the external device 310 may be a server which is connectable with the external device over a network and distributes an application. For example, the external device 310 may include an application market server which distributes an application available to the electronic device.

According to another embodiment, the external device 310 may be a user device connectable with the electronic device over the network. For example, the user device may include a desktop or laptop PC. The user device may be connected with an application distribution server over a network and may obtain an application from the application distribution server. When the electronic device is connected with the user device, the user device may transmit the obtained application to the electronic device.

According to an embodiment, the first application 301 stored in the memory 130 may be installed when the electronic device is manufactured. The electronic device may obtain the first application 301 from the outside to store the first application 301 in the memory 130. The second application 302 may be a new application which is downloaded and installed from the external device 310. The electronic device may compare a list of applications stored in the electronic device from the external device 310 and version information of each application with version information of an application provided from the external device 310. When an application of another version different from a version of an application having the same identification information (e.g., an application package name such as Facebook, Chrome, or Google Maps) is present in the external device 310, the electronic device may download the application of the other version from the external device 310. In various example embodiments disclosed herein, the first application 301 may be described as, or refer, for example, to being an application of an old version, which is installed in the electronic device, and the second application 302 may be described as being an application of a new version, which has the same identification information as the first application 301.

According to an embodiment, the first application 301 may be electrically signed using a first signature key or a simple first key to be provided to the electronic device. Information about the first key may be included in a file included in an installation package of the first application 301 (e.g., the CERT.RSA file included in an application packet of the Android operating system).

The second application 302 may be electrically signed using a second signature key or a simple second key to be provided to the electronic device. The processor 120 may compare information (or a file) about the second key included in the second application 302 with the information (or file) about the first key. When the first key and the second key are identical to each other, the processor 120 may update the first application 301 to the second application 302. For example, the processor 120 may delete the first application 301 and may install the second application 302. For another example, the processor 120 may patch some files of the first application 301 using a file of the second application 302. For another example, the processor 120 may add data to the first application 301 using a file of the second application 302. In other words, the processor 120 may replace at least a portion of the first application 301 with at least a portion of the second application 302. For example, the processor 120 may replace some or all of configurations (files and/or folders) of an application package with configurations of a package of a new application. Hereinafter, a configuration simply referred to as the first key or the second may be various types of signature information for authenticating a developer of the application.

Furthermore, according to an embodiment, the first application 301 may have a first user ID (UID) assigned according to a policy of an operating system installed in the electronic device. The electronic device may construct a first sandbox environment accessible by the first application 301 based on the first UID. When updating the first application 301 to the second application 302, the electronic device may determine whether the second application 302 is able to have the first UID. For example, when a shared ID is assigned to the first application 301 and when it is impossible to assign the shared UID because a policy of the operating system is changed, the electronic device may determine that it is necessary to change the first UID to a second UID which is a normal UID.

In conjunction with FIG. 3, various components may be added or modified. For example, various modules, interfaces, sensors, or the like shown in FIG. 1 may be added to the configuration of FIG. 3 or may be replaced with components of FIG. 3. Contents described in conjunction with FIG. 3 and another embodiment are applicable to contents associated with FIG. 1 or 2. Similarly, contents described in conjunction with FIGS. 1 and 2 are applicable to a description of FIGS. 3 to 10.

Figure 4:
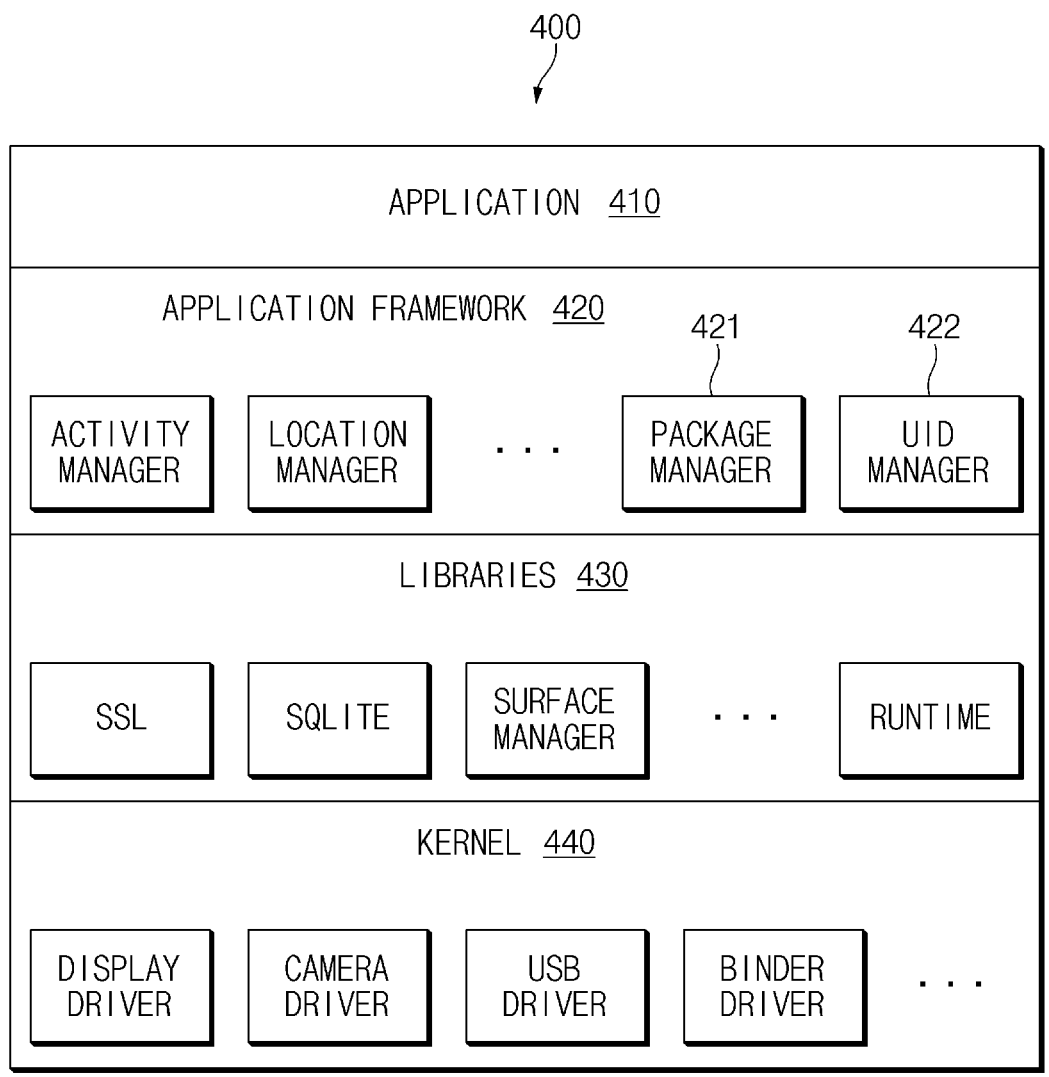
FIG. 4 is a diagram illustrating an example program module for managing an application of an electronic device according to an embodiment.

FIG. 4 is a diagram illustrating an example program module 400 for managing an application of an electronic device (e.g., an electronic device 101 of FIG. 1).

According to an embodiment, the program module 400 may be configured to include an application 410, an application framework 420, libraries 430, and layers of a kernel 440. The program module 400 illustrated in FIG. 4 illustrates an example program module using an operating system according to an embodiment and is not to be limited to a specific operating system. An operation associated with the program module 400 may be performed by a processor (e.g., a processor 120 of FIG. 1 or a processor 120 of FIG. 3). Furthermore, embodiments about an electronic device disclosed in the disclosure may be configured to be applicable to another operating system (e.g., Tizen™, iOS™, Windows™, or the like).

A package manager 421 and a UID manager 422 according to an embodiment may be implemented in the application framework 420. The package manager 421 may manage installation of an application package and an application. For example, the package manager 421 may identify a package name of an installed application package. Furthermore, the package manager 421 may identify whether an application to be installed, which has the same package name, is installed in the electronic device. The package name may be included in identification information of the application. The package manager 421 may determine whether it is necessary to change a UI of the application. When it is determined that a change in UID is requested, the package manager 421 may deliver a UID change request to the UID manager 422.

The UID manager 422 according to an embodiment may flexibly manage the UID of the application. The UID manager 422 may assign a UID to the application or change the UID assigned to the application, in response to the UID change request of the package manager 421. Furthermore, when the UID is assigned to the application or when changing the assigned UID, the UID manager 422 may request the kernel 440 to construct a sandbox based on the newly assigned UID.

When changing the UID assigned to the application, the UID manager 422 according to an embodiment may obtain resource information about one or more resources included in a first sandbox accessible based on the UID before being changed. According to an embodiment, the resource included in the sandbox may refer, for example, to a resource included in an application package of the application. Furthermore, the UID manager 422 may request the kernel 440 to construct a second sandbox having the one or more resources included in the first sandbox based on the obtained resource information. The kernel 440 may construct the second sandbox which is accessible using the changed UID in response to the request of the UID manager 422 and has the one or more resources included in the first sandbox.

Figure 5:
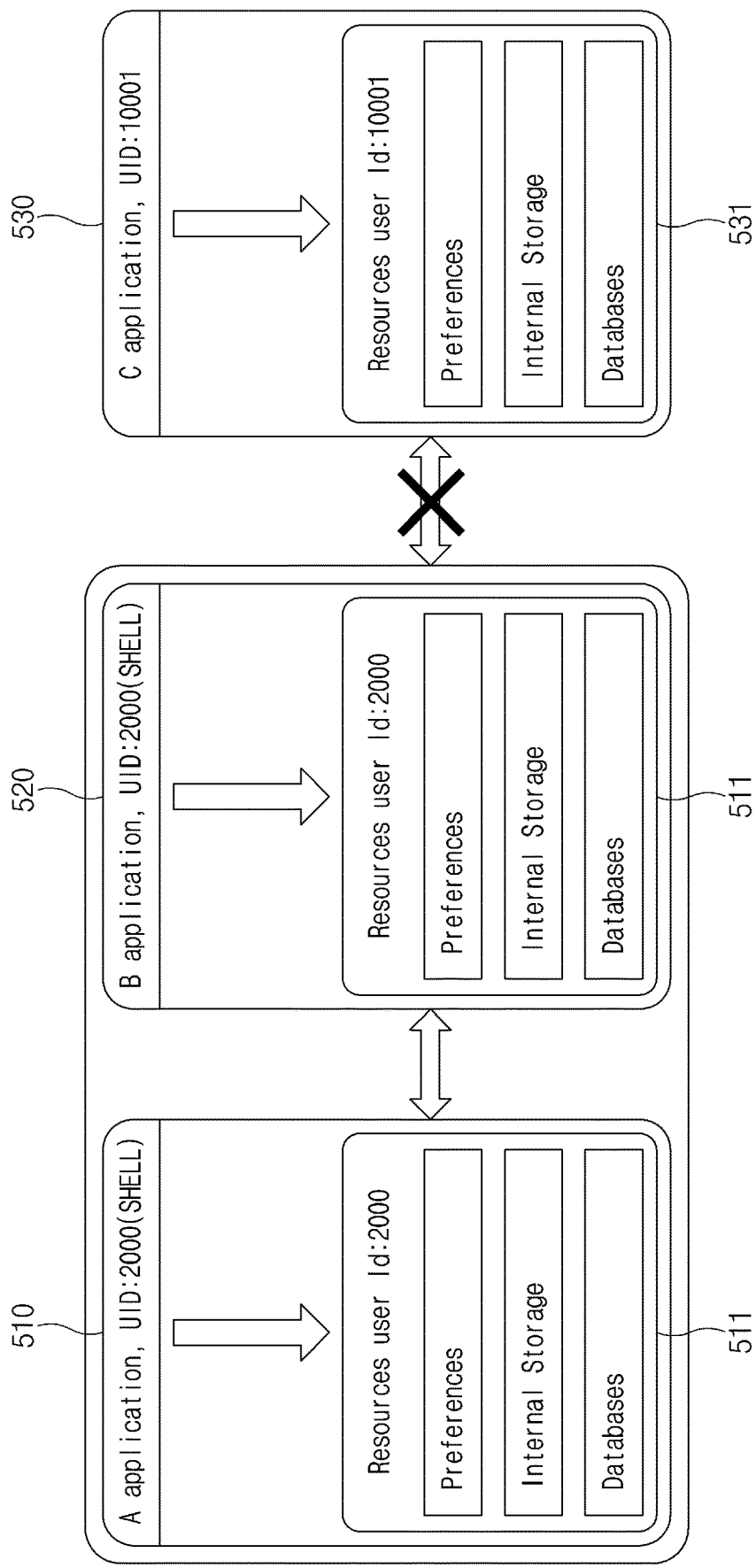
FIG. 5 is a diagram illustrating an example method where an application of an electronic device accesses a sandbox environment according to an embodiment.

FIG. 5 is a diagram illustrating an example method where an application of an electronic device (e.g., an electronic device 101 of FIG. 1) accesses a sandbox environment. For example, FIG. 5 illustrates an example where A application 510, B application 520, and C application 530 are installed in an electronic device.

In principle, a UID assigned to an application by the electronic device is not duplicated. Herein, as an exception, when it is necessary to share a resource between applications, the same UI may be assigned to two or more applications using the shared UID. As an example of the Android™ operating system, two or more applications may be electrically signed and provided using the same signature key, and the same sharing UID may be set through AndroidManifest.xml to install an application.

In the disclosure, the same signature key may include belonging to a signature key group to which the first signature key and the second signature key belong (a group for managing a signature key) as well as when the signature key itself is perfectly the same.

Referring to FIG. 5, A application 510 and B application 520 are electronically signed and provided using the same signature key, and 2000 which is a shared UID is assigned to A application 510 and B application 520. Thus, A application 510 and B application 520 may share a resource included in the same sandbox 511.

In comparison, 10001 which is a normal UID is assigned to C application 530. C application 530 may access a resource of a sandbox 531 configured based on 10001 which is the normal UID, but may not access a resource of the sandbox 511 where the UID is 2000.

Figure 6:
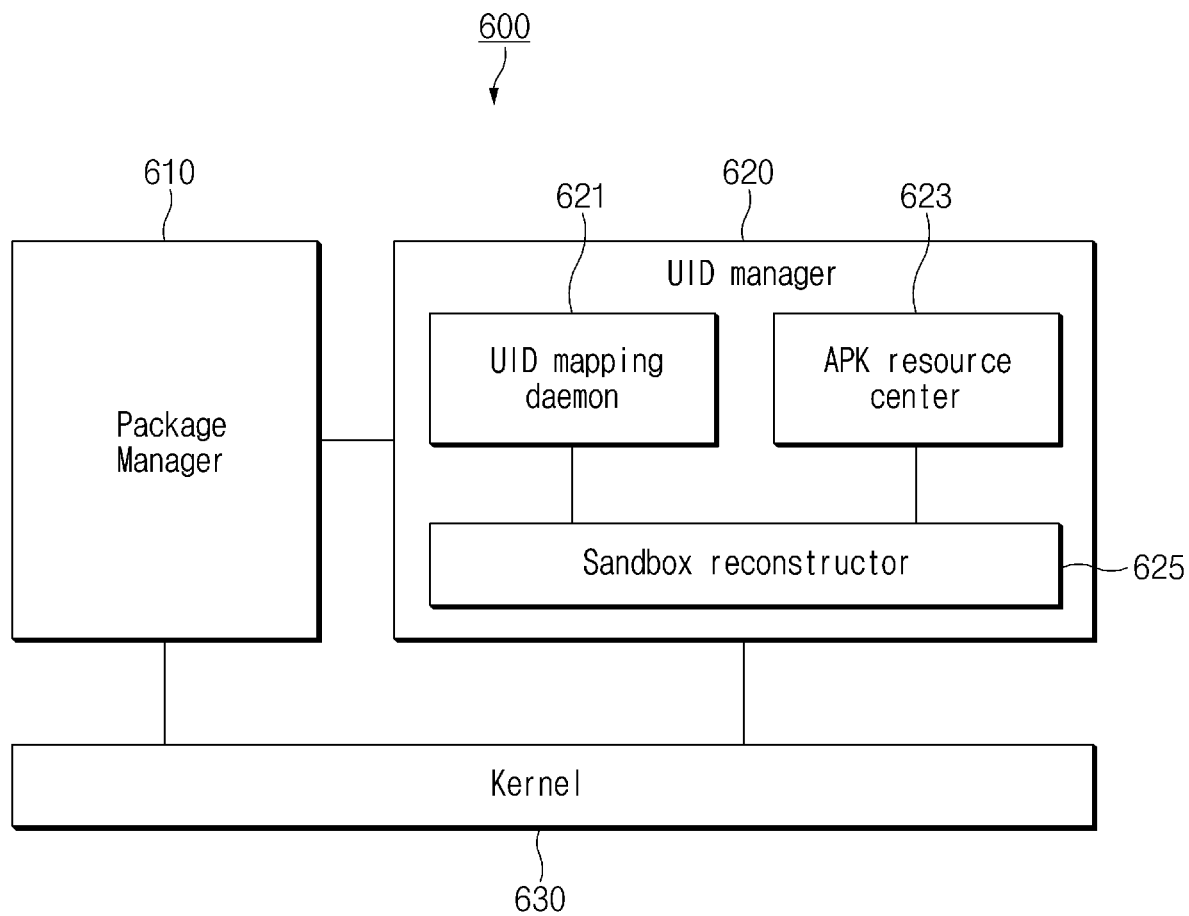
FIG. 6 is a block diagram illustrating an example configuration of an electronic device for managing a user ID (UID) of an application according to an embodiment.

FIG. 6 is a block diagram 600 illustrating an example configuration of an electronic device (e.g., an electronic device 101 of FIG. 1) for managing a UID of an application according to an embodiment.

The electronic device according to an embodiment may be configured to include a package manager 610, a UID manager 620, and a kernel 630. The package manager 610 may manage information about applications installed in the electronic device. When an application is installed or deleted from the electronic device, the package manager 610 may register or delete information of the application. According to an embodiment, information about each application may be separately stored for each package name of an application package in a memory (e.g., a memory 130 of FIG. 1 or a memory 130 of FIG. 3) of the electronic device. The information of the application may include at least one of, for example, an app code path, a UID, signature information, and available authorization information. When the package manager 610 should change a UID when updating an application installed in the electronic device, it may deliver a UID change request to the UID manager 620.

The UID manager 620 according to an embodiment may include a UID mapping resident program (e.g., daemon), a APK resource center 623, and a sandbox reconstructor 625. When receiving the UID change request for an updated application from the package manager 610, the UID manager 620 may deliver a sandbox reconstruction request to the kernel 630 to assign a new UID to the application and construct a sandbox based on the assigned UID.

The UID mapping resident program 621 may assign the new UID to the application in response to the UID change request received from the package manager 610. The UID mapping resident program 621 may manage a UID list such that duplication and interference between UIDs assigned to applications do not occur.

The APK resource center 623 may obtain resource information about a resource included in a sandbox of a previously installed application package. Resources included in a previously constructed sandbox may move to a newly constructed sandbox using the resource information obtained by the APK resource center 623.

The sandbox reconstructor 625 may deliver the UID newly assigned by the UID mapping resident program 621 and the resource information obtained by the APK resource center 623 to the kernel 630. Thus, the kernel 630 may construct a new sandbox to move a resource included in a sandbox of an old application to the newly constructed sandbox.

The kernel 630 may be software of the lowest stage forming a platform. The kernel 630 may apply a location, a resource directory, and a sandbox policy of the installed application. The kernel 630 may construct a sandbox accessible based on a UID assigned to an application in response to a sandbox reconstruction request. Furthermore, the kernel 630 may store a resource in a sandbox in response to a request of the package manager 610 or the UID manager 620.

Figure 7:
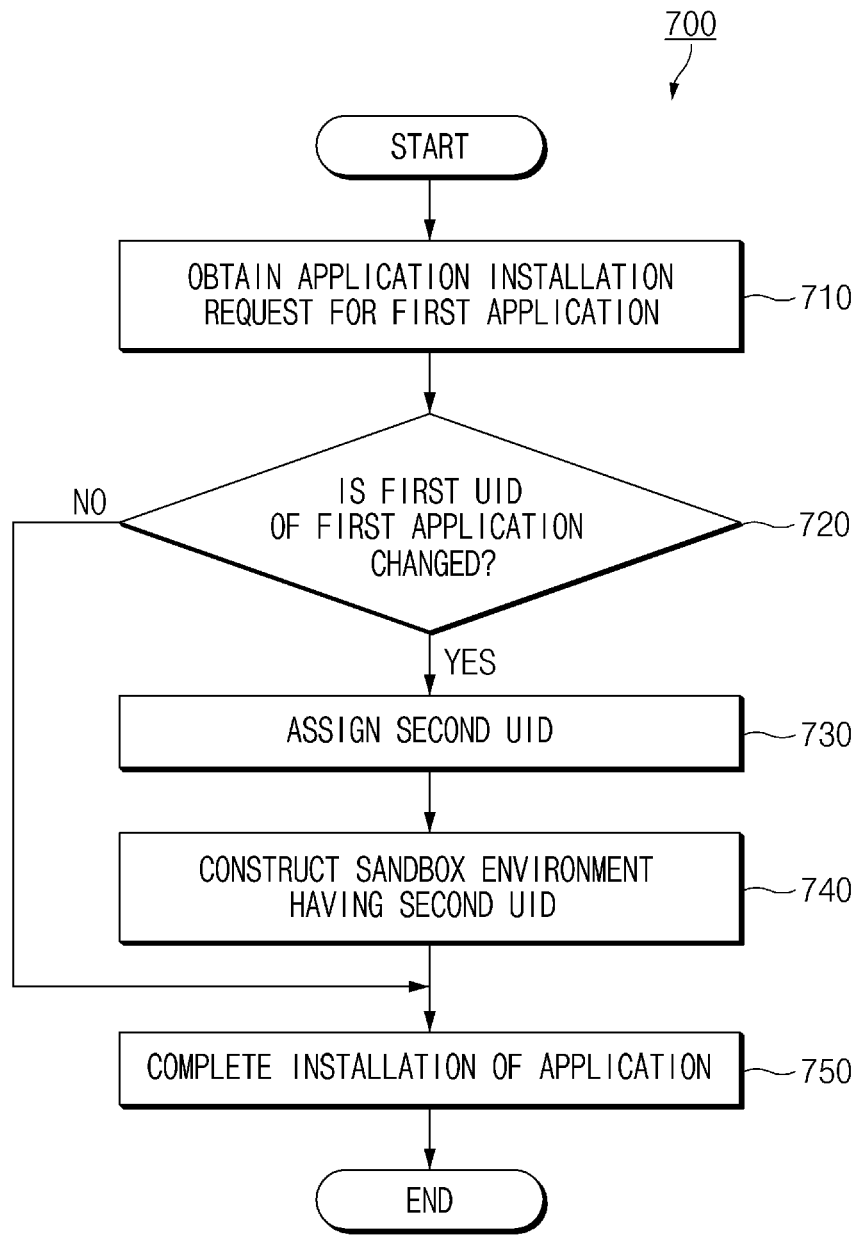
FIG. 7 is a flowchart illustrating an example process where an electronic device updates an application according to an embodiment.

FIG. 7 is a flowchart 700 illustrating an example process where an electronic device (e.g., an electronic device 101 of FIG. 1) updates an application according to an embodiment.

In operation 710, the electronic device according to an embodiment may obtain an application installation request associated with a first application. The application installation request associated with the first application may be to request to update the first application to a second application. For example, the electronic device may compare at least one application stored in the electronic device with at least one application distributed from an external device (e.g., an electronic device 102 of FIG. 1, an electronic device 104 of FIG. 1, a server 108 of FIG. 1, or an external device 310 of FIG. 3). When there is a second application which has the same identification (e.g., the same application package name) as the first application and has a different version from the first application, the electronic device may generate an application installation request to update the first application to the second application. For another example, the electronic device may receive the application installation request from the external device (e.g., the electronic device 102 of FIG. 1, the electronic device 104 of FIG. 1, the server 108 of FIG. 1, or the external device 310 of FIG. 3). For another example, the electronic device may receive a user input for generating an application installation request from a user in response to information output via an output device (e.g., a display device 160, a sound output device 155, or a haptic module 179 of FIG. 1) of the electronic device. According to an embodiment, the first application may be executed using resources assigned to a first sandbox environment. In the disclosure, the expression that the application installation request is generated may include when the electronic device itself generates the application installation request or when the electronic device receives the application installation request from the outside.

In operation 720, the electronic device may determine whether it is necessary to change a first UID of the first application. According to an embodiment, the electronic device may identify the first UID of the first application and may determine whether it is possible to assign the first UID to an application newly installed in the electronic device.

When it is necessary to change the first UID ("Yes" in operation 720) (e.g., when it is impossible to assign the first UID to the application newly installed in the electronic device), in operation 730, the electronic device may assign a second UID to an application to be installed. For example, a shared UID may be assigned according to a policy of a platform installed in the electronic device when the first application is installed, but it is impossible to assign the shared UID depending to a change in policy. In this case, the updated second application may fail to use the shared UID. Thus, the electronic device may assign a normal UID to the second application.

In operation 740, the electronic device may construct a second sandbox environment having the second UID. In other words, the electronic device may construct the second sandbox environment accessible by the second application having the second UID. However, when the second application is simply run based on the newly constructed second sandbox environment, it may fail to use a resource used by the first application. For example, because it is impossible for the second application to use user data (e.g., a user account, a document file, or environment setup for an application) generated by a user input while the first application is running, there may occur an inconvenience where a user should generate user data again using the second application. Thus, the electronic device may construct a second sandbox environment such that the second sandbox environment has a resource included in the first sandbox environment.

When the second sandbox environment is constructed, in operation 740, the electronic device may complete the installation of the second application based on the second UID and the second sandbox environment in operation 750.

When it is determined that it is not necessary to change the first UID in operation 720 ("No" in operation 720), in operation 750, the electronic device may complete the installation of the second application based on the first UID and the first sandbox environment.

Figure 8:
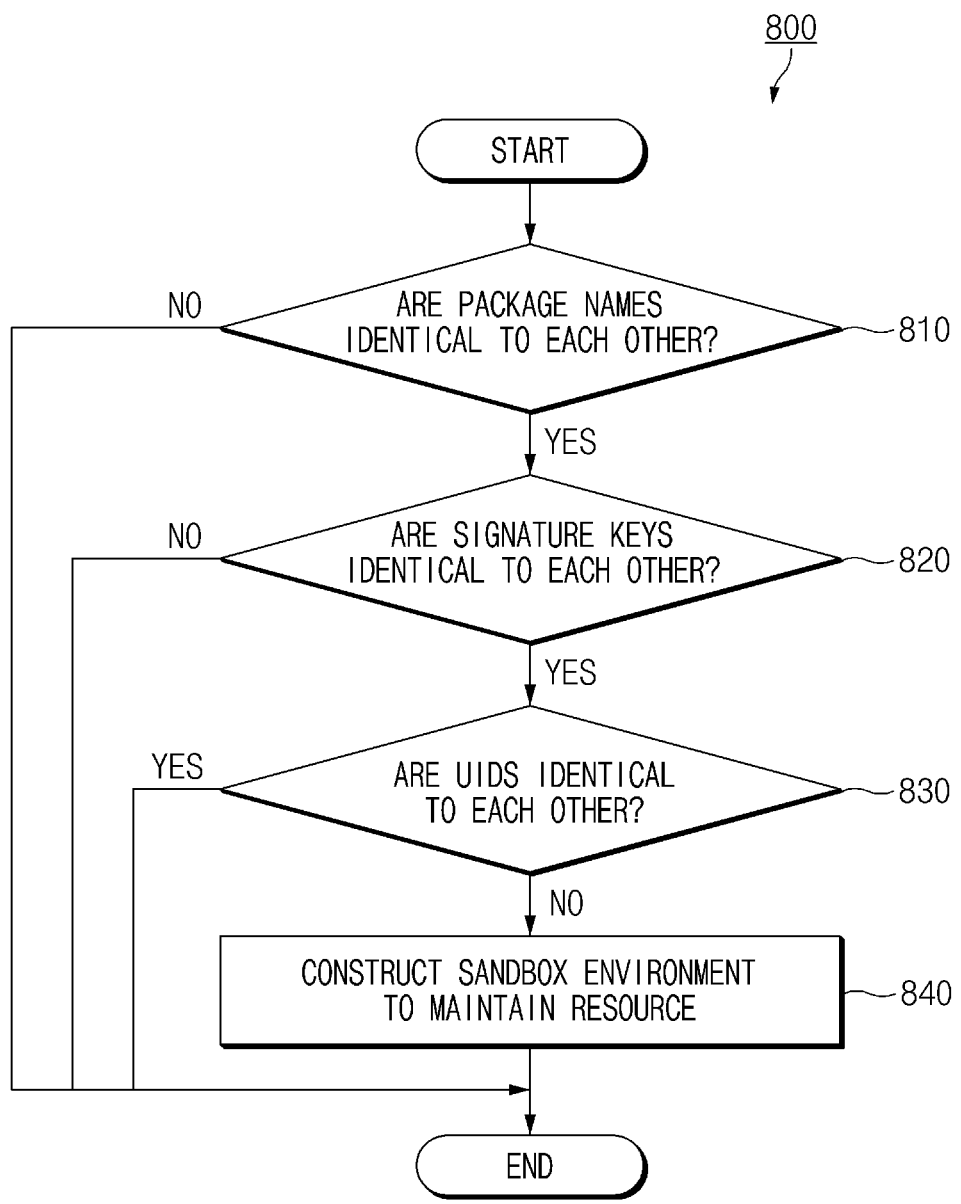
FIG. 8 is a flowchart illustrating an example process where an electronic device constructs a sandbox of an updated application according to an embodiment.

FIG. 8 is a flowchart 800 illustrating an example process (e.g., operations 720, 730 and 740 of FIG. 7) where an electronic device (e.g., an electronic device 101 of FIG. 1) constructs a sandbox of the updated application according to an embodiment.

In operation 810, the electronic device according to an embodiment may determine whether a first application having the same package name as a second application, an application installation request of which occurs, is installed in the electronic device. Herein, the package name may describe an embodiment, and is not limited thereto. In other words, the electronic device may search for the first application having identification information matched with identification information of a second application to be installed.

When an application matched with the second application to be installed is not installed in the electronic device, the electronic device may install the second application as a new application.

When the first application having the same package name as the second application, the application installation request of which occurs, is found ("Yes" in operation 810), the electronic device may determine whether signature keys of the first application and the second application are identical to each other in operation 820. For example, the electronic device may obtain signature information included in the first application to identify the signature key of the first application. The electronic device may identify whether information corresponding to the signature key is included in the second application. When the second application is not authenticated based on the signature key of the first application, the electronic device may fail to install the second application in place of the first application. On the other hand, when the second application is authenticated based on the signature key of the first application, the electronic device may install the second application in place of the first application. In other words, the electronic device may update the first application to the second application.

When desiring to install the second application in place of the first application, in operation 830, the electronic device may determine whether a first UID assigned to the first application is identical to a second UID to be assigned to the second application.

When the first UID is not identical to the second UID to be assigned to the second application, in operation 840, the electronic device may construct a second sandbox environment to include resources included in a first sandbox environment of the first application. When the first UID and the second UID are identical to each other, because the electronic device assigns the first UID to the second application such that the second application may access a resource included in the first sandbox environment, the electronic device may fail to construct a new sandbox environment.

Figure 9:
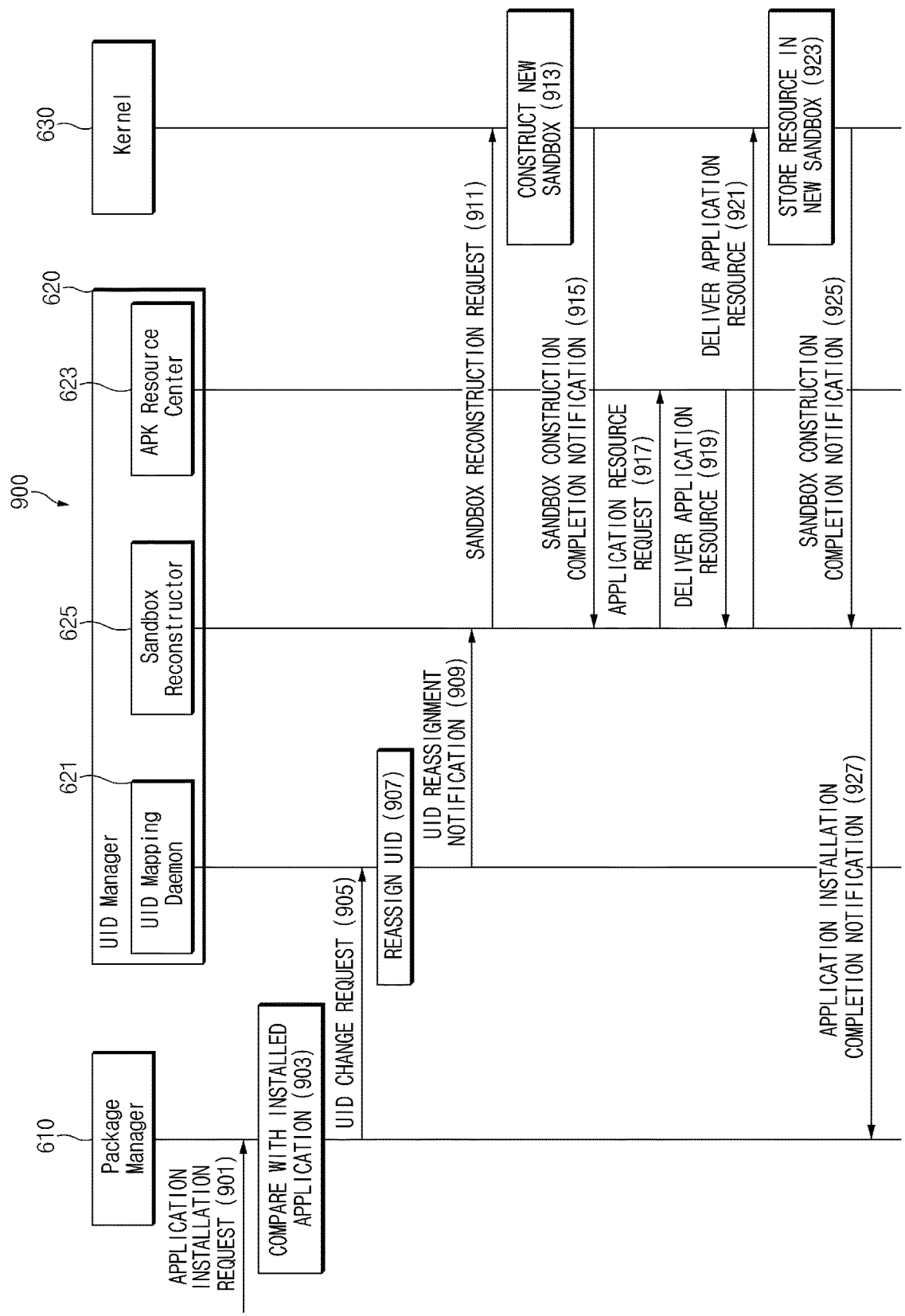
FIG. 9 is a signal flow diagram illustrating an example process where a component of an electronic device updates an application according to an embodiment.

FIG. 9 is a signal flow diagram 900 illustrating an example process where a component of an electronic device (e.g., an electronic device 101 of FIG. 1) updates an application according to an embodiment.

In operation 901 a package manager 610 may receive an application installation request requesting to install a second application. In operation 903, the package manager 610 may compare the second application with at least one application installed in the electronic device in response to the application installation request. The package manager 610 may determine whether to update a first application installed in the electronic device to the second application based on the compared result and may determine whether it is necessary to change a UID assigned to the first application.

When it is determined that it is necessary to change the UID, in operation 905, the package manager 610 may deliver a UID change request to a UID mapping resident program 621 of a UID manager 620. In response to the UID change request, in operation 907, the UID mapping resident program 621 may reassign a UID. In other words, the UID mapping resident program 621 may assign a second UID to replace a first UID assigned to the first application.

In operation 909, the UID mapping resident program 621 may deliver a UID reassignment notification for notifying a sandbox reconstructor 625 that the UID is reassigned to the sandbox reconstructor 625. In operation 911, the sandbox reconstructor 625 may deliver a sandbox reconstruction request requesting a kernel 630 to construct a new sandbox to the kernel 630 in response to the UID reassignment notification.

In response to the sandbox reconstruction request, in operation 913, the kernel 630 may construct a new sandbox. Constructing the new sandbox, the kernel 630 may deliver a sandbox construction completion notification for the constructed new sandbox to the sandbox reconstructor 625 in operation 915. Herein, resources previously included in a sandbox of the first application may fail to be included in the sandbox generated by the kernel 630.

In operation 917, the sandbox reconstructor 625 may deliver an application resource request requesting resource information for the first application (e.g., information for identifying resources included in the first sandbox environment) to a APK resource center 623. In operation 919, the sandbox reconstructor 625 may receive resource information about the first application in response to the application resource request. In operation 921, the sandbox reconstructor 625 may deliver the obtained resource information to the kernel 630. In operation 923, the kernel 630 may store the resource information transmitted from the sandbox reconstructor 625 in the new sandbox such that an application capable of accessing the new sandbox may use a resource included in the resource information.

Storing the resource information in the sandbox, in operation 925, the kernel 630 may deliver a sandbox construction completion notification to the sandbox reconstructor 625. Receiving the sandbox construction completion notification, in operation 927, the sandbox reconstructor 625 may deliver an application installation completion notification to the package manager 610.

Figure 10:
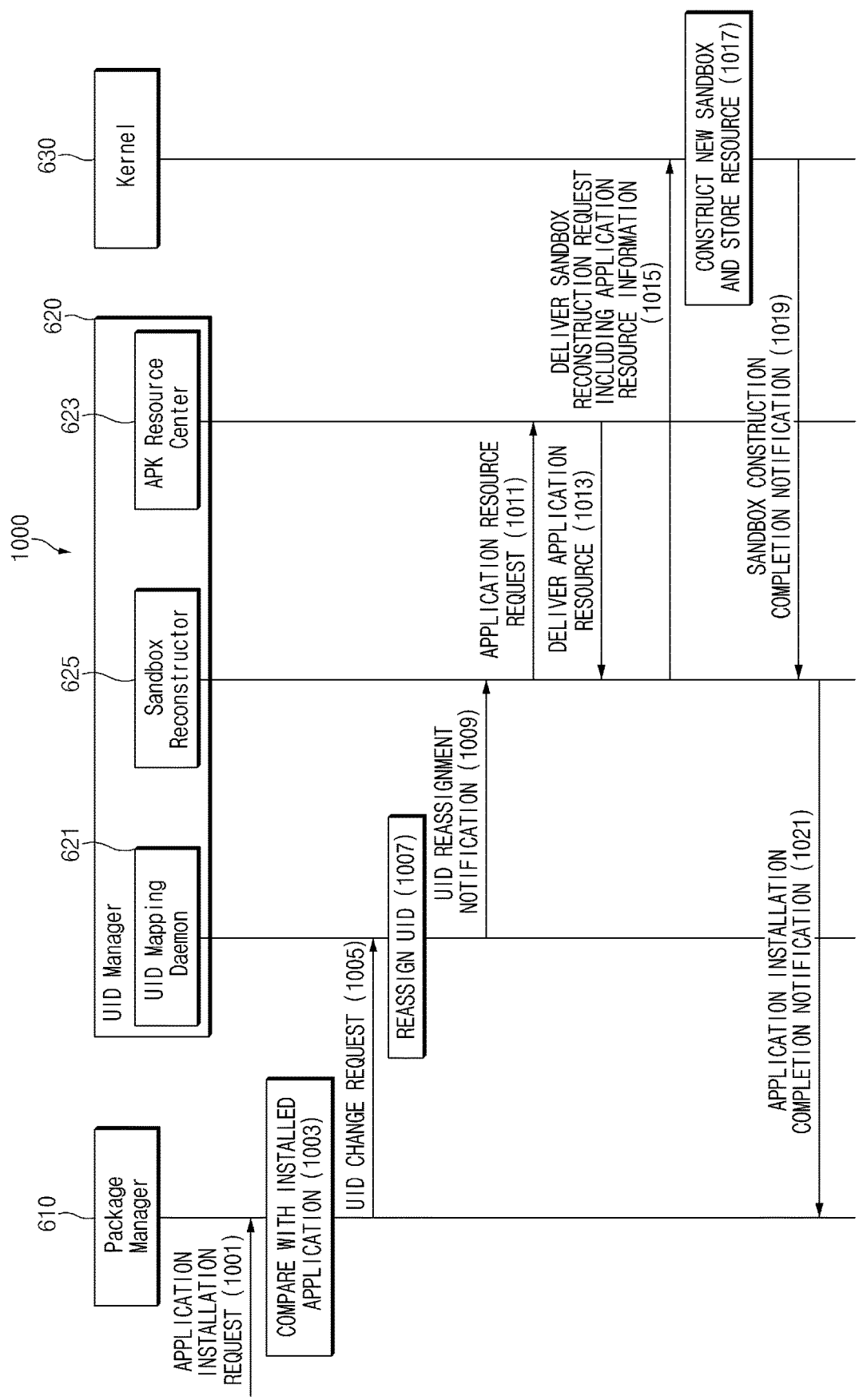
FIG. 10 is a signal flow diagram illustrating an example process where a component of an electronic device updates an application according to another embodiment.

FIG. 10 is a signal flow diagram 1000 illustrating an example process where an electronic device (e.g., an electronic device 101 of FIG. 1) updates an application according to another embodiment.

In operation 1001, a package manager 610 may receive an application installation request requesting to install a second application. In operation 1003, the package manager 610 may compare the second application with at least one application installed in the electronic device in response to the application installation request. The package manager 610 may determine whether to update a first application installed in the electronic device to the second application based on the compared result and may determine whether it is necessary to change a UID assigned to the first application.

When it is determined that it is necessary to change the UID, the package manager 610 may deliver a UID change request in operation 1005 to a UID mapping resident program 621 of a UID manager 620. In response to the UID change request, in operation 1007, the UID mapping resident program 621 may reassign a UID. In other words, the UID mapping resident program 621 may assign a second UID to replace a first UID assigned to the first application. In operation 1009, the UID mapping resident program 621 may deliver a UID reassignment notification for notifying a sandbox reconstructor 625 that the UID is reassigned to the sandbox reconstructor 625.

In operation 1011, the sandbox reconstructor 625 may deliver an application resource request requesting resource information about the first application to a APK resource center 623. In operation 1013, the sandbox reconstructor 625 may receive the resource information about the first application from the APK resource center 623 in response to the application resource request.

In operation 1015, the sandbox reconstructor 625 may deliver a sandbox reconstruction request including resource information about the first application to a kernel 630. In response to the sandbox reconstruction request, in operation 1017, the kernel 630 may construct a new sandbox which includes resources used by the first application and is accessible based on a second UID and store the resource information.

Constructing the new sandbox, in operation 1019, the kernel 630 may deliver a sandbox construction completion notification to the sandbox reconstructor 625. Receiving the sandbox construction completion notification, in operation 1021, the sandbox reconstructor 625 may deliver an application installation completion notification to the package manager 610.

The electronic device according to various example embodiments disclosed in the disclosure may be various types of devices. The electronic device may include, for example, a portable communication device (e.g., a smartphone), a computer device, a portable multimedia device, a mobile medical appliance, a camera, a wearable device, a home appliance, or the like. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be understood to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 140) including an instruction stored in a machine-readable storage medium (e.g., an internal memory 136 or an external memory 138) readable by a machine (e.g., the electronic device 101). For example, the processor (e.g., the processor 120) of a machine (e.g., the electronic device 101) may call the instruction from the machine-readable storage medium and execute the instructions thus called. The machine may perform at least one function based on the called at least one instruction. The one or more instructions may include a code generated by a compiler or a code executable by an interpreter. The machine-readable storage medium may be provided in the form of non-transitory storage medium. Here, the "non-transitory", storage medium is tangible, but may not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

It may not be possible to change a user ID (UID) after the application is installed. However, according to embodiments disclosed in the disclosure, the electronic device may update an application to have another ID.

When a UID is changed to update an application, the existing application is deleted together with user data generated before being updated or the updated application does not use the existing user data. However, according to embodiments disclosed in the disclosure, the updated application may use user data generated before being updated.

In addition, various effects ascertained directly or indirectly through the disclosure may be provided.

While the disclosure has been illustrated and described with reference to various example embodiments thereof, it will be understood that the various example embodiments are intended to be illustrative, not limiting. It will be further understood by those skilled in the art that various changes in form and details may be made therein without departing from the true spirit and full scope of the disclosure, including the appended claims and their equivalents.

What is claimed is:

1. An electronic device, comprising:
a memory; and
a processor connected with the memory,
wherein the processor is configured to:
run a first application using a resource included in a first resource space accessible to the first application to which a first user identifier (UID) is assigned;

determine whether to change the first UID for the first application in response to an application installation request requesting to update the first application to a second application;

assign a second UID for the second application based on a determination to change the first UID; and configure a second resource space for the second application based on the second UID and the resource included in the first resource space.

2. The electronic device of claim 1, wherein the processor is configured to determine whether to change the first UID based on the result of comparing the first application with the second application to determine whether the second application is an application replacing the first application.

3. The electronic device of claim 2, wherein the processor is configured to determine whether the second application is the application replacing the first application based on whether a package name of the first application is identical to a package name of the second application.

4. The electronic device of claim 2, wherein the processor is configured to determine whether the second application is the application replacing the first application based on the result of comparing a signature key of the first application with a signature key of the second application.

5. The electronic device of claim 4, wherein the processor is configured to determine that the second application is the application replacing the first application based on the signature key of the first application and the signature key of the second application belonging to the same signature key group.

6. The electronic device of claim 2, wherein the processor is configured to determine to change the first UID based on the second application being the application replacing the first application and based on the first UID differing from the second UID capable of being assigned to the second application.

7. The electronic device of claim 6, wherein the first UID is a shared UID, and wherein the second UID is a normal UID.

8. The electronic device of claim 1, wherein the processor is configured to configure the second resource space that can be accessed based on the second UID and to store the resource included in the first resource space in the configured second resource space.

9. The electronic device of claim 1, wherein the processor is configured to collect resource information about the resource included in the first resource space based on determining to change the first UID and to configure the second resource space to include the resource included in the first resource space based on the resource information.

10. The electronic device of claim 1, wherein the resource included in the first resource space is included in an application package of the first application.

11. A method for updating an application in an electronic device, the method comprising:

running a first application using a resource included in a first resource space accessible to the first application to which a first user identifier (UID) is assigned;

obtaining an application installation request requesting to update the first application to a second application;

determining whether to change a first UID for the first application in response to the application installation request;

assigning a second UID for the second application based on determining to change the first UID; and configuring a second resource space for the second application based on the second UID and the resource included in the first resource space.

12. The method of claim 11, wherein the determining of whether to change the first UID includes:

comparing the first application with the second application;

determining whether the second application is an application replacing the first application based on the comparing; and determining whether to change the first UID based on the result of determining whether the second application is the application replacing the first application.

13. The method of claim 12, wherein the comparing of the first application and the second application includes:

determining whether a package name of the first application is identical to a package name of the second application.

14. The method of claim 13, wherein the comparing of the first application and the second application includes:

comparing a signature key of the first application with a signature key of the second application based on the package name of the first application being identical to the package name of the second application; and determining whether the second application is the application replacing the first application based on the result of comparing the signature keys.

15. The method of claim 14, wherein the determining of whether the second application is the application replacing the first application based on the result of comparing the signature keys includes:

determining that the second application is the application replacing the first application based on the signature key of the first application and the signature key of the second application belonging to the same signature key group.

16. The method of claim 12, wherein the determining whether to change the first UID includes:

comparing the first UID with the second UID based on the second application being the application replacing the first application; and determining to change the first UID based on the first UID differing from the second UID.

17. The method of claim 16, wherein the first UID is a shared UID, and wherein the second UID is a normal UID.

18. The method of claim 11, wherein the configuring of the second resource space includes:

configuring the second resource space that can be accessed based on the second UID;

and storing the resource included in the first resource space in the configured second resource space.

19. The method of claim 11, further comprising:

collecting resource information about the resource included in the first resource space based on determining to change the first UID, wherein the configuring of the second resource space includes:

configuring the second resource space to include the resource included in the first resource space based on the resource information.

20. The method of claim 11, wherein the resource included in the first resource space is included in an application package of the first application.

* * * * *